(12) United States Patent
Zager et al.

(10) Patent No.: US 10,265,651 B2
(45) Date of Patent: Apr. 23, 2019

(54) COMPACT WATER EXTRACTOR

(71) Applicant: Hamilton Sundstrand Corporation, Windsor Locks, CT (US)

(72) Inventors: Michael Zager, Windsor, CT (US); Christopher McAuliffe, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 116 days.

(21) Appl. No.: 15/350,751

(22) Filed: Nov. 14, 2016

(65) Prior Publication Data

US 2018/0133634 A1    May 17, 2018

(51) Int. Cl.

| B01D 45/12 | (2006.01) |
| B01D 45/16 | (2006.01) |
| B33Y 10/00 | (2015.01) |
| B33Y 70/00 | (2015.01) |
| B33Y 80/00 | (2015.01) |
| B64D 13/06 | (2006.01) |
| F25B 9/00 | (2006.01) |
| F25B 47/00 | (2006.01) |
| B64D 13/00 | (2006.01) |

(52) U.S. Cl.
CPC ............. *B01D 45/16* (2013.01); *B33Y 10/00* (2014.12); *B33Y 70/00* (2014.12); *B33Y 80/00* (2014.12); *B64D 13/00* (2013.01); *B64D 13/06* (2013.01); *F25B 9/004* (2013.01); *F25B 47/00* (2013.01); *B64D 2013/0618* (2013.01); *B64D 2013/0662* (2013.01); *F25B 2500/14* (2013.01)

(58) Field of Classification Search
None
See application file for complete search history.

(56) References Cited

U.S. PATENT DOCUMENTS

| 948,062 A | 2/1910 | Morgan |
| 1,100,603 A | 6/1914 | Mosher |

(Continued)

FOREIGN PATENT DOCUMENTS

| DE | 2702148 A1 | 7/1978 |
| EP | 2799341 A1 | 11/2014 |

(Continued)

OTHER PUBLICATIONS

Extended European Search Report for EP Application No. 17190530.0, dated Mar. 19, 2018, 8 Pages.

*Primary Examiner* — Amber R Orlando
*Assistant Examiner* — Phillip Y Shao
(74) *Attorney, Agent, or Firm* — Kinney & Lange, P.A.

(57) ABSTRACT

A water extractor includes an inlet, an outlet a body, outer wall, inner wall, helical wall, plurality of catchment areas, and scuppers. The body extends between the inlet and the outlet. The inner wall is disposed radially inward from the outer wall and forms a main flow channel through a portion of the body. The helical wall extends between and is connected to the outer wall and the inner wall and forms a helical passageway fluidly connected to the inlet and the outlet. The helical passageway includes a plurality of turns along a bottom of the body. One of the catchment areas is disposed in each turn of the helical passageway. The scuppers are disposed in the catchment areas and are connected to and extend radially inward from the outer wall.

12 Claims, 5 Drawing Sheets

(56) References Cited

U.S. PATENT DOCUMENTS

| | | | |
|---|---|---|---|
| 4,179,273 A * | 12/1979 | Montusi | B01D 45/16 210/512.1 |
| 4,322,233 A * | 3/1982 | Sisk | F22B 37/327 376/371 |
| 4,681,610 A | 7/1987 | Warner | |
| 5,531,811 A | 7/1996 | Kloberdanz | |
| 5,983,842 A * | 11/1999 | Nishi | B01D 1/305 122/34 |
| 6,331,195 B1 | 12/2001 | Faust et al. | |
| 8,034,142 B2 | 10/2011 | Sakakida et al. | |
| 8,601,826 B2 | 12/2013 | Army et al. | |
| 2002/0038760 A1 * | 4/2002 | Salmisuo | B01D 1/065 203/10 |
| 2006/0021356 A1 | 2/2006 | Milde et al. | |

FOREIGN PATENT DOCUMENTS

| | | |
|---|---|---|
| JP | S5936822 U | 3/1984 |
| JP | 2006205077 A | 8/2006 |
| WO | WO0224299 A1 | 3/2002 |

\* cited by examiner

COMPACT WATER EXTRACTOR

BACKGROUND

The present disclosure relates generally to water extractors, and more particularly to water extractors for use in aircraft air conditioning systems.

In aircraft air conditioning systems, moisture must be collected and drained from engine bleed air, or compressed ambient air, at a location downstream of a condenser to prevent re-entry into the cabin or air cycle machine where the moisture may cause damage. Existing air conditioning systems rely on forcing water particles into an inner diameter of a duct and into a scavenge flow area where the velocity of the water is decreased due to an increasing flow area of the scavenge flow area. An example of a prior art system can be found in U.S. Pat. No. 4,681,610. Existing water extractors are necessarily large to account for the increasing scavenge flow areas. Existing water extractors are also made of multiple pieces that are often brazed, welded, and/or bonded, requiring numerous steps to assemble.

SUMMARY

A water extractor includes an inlet, an outlet, a body, outer wall, inner wall, helical wall, plurality of catchment areas, and scuppers. The body extends between the inlet and the outlet. The inner wall is disposed radially inward from the outer wall and forms a main flow channel through a portion of the body. The helical wall extends between and is connected to the outer wall and the inner wall and forms a helical passageway fluidly connected to the inlet and the outlet. The helical passageway includes a plurality of turns along a bottom of the body. One of the catchment areas is disposed in each turn of the helical passageway. The scuppers are disposed in the catchment areas and are connected to and extend radially inward from the outer wall.

A method of making a water extractor includes creating an electronic file defining the water extractor in layers. The water extractor is built on a layer-by-layer basis with an additive manufacturing process in accordance with the electronic file. The water extractor includes a body, outer wall, inner wall, helical wall, plurality of catchment areas, and scuppers. The body includes an inlet and an outlet. The inner wall is disposed radially inward from the outer wall and forms a main flow channel through a portion of the body. The helical wall extends between and is connected to the outer wall and the inner wall and forms a helical passageway fluidly connected to the inlet and the outlet. The helical passageway includes an entrance and an ejector. The entrance is disposed at an upstream end of the helical passageway. The ejector is disposed at a downstream end of the helical passageway. The helical passageway includes a plurality of turns along a bottom of the body. One of the plurality of catchment areas is disposed in a turn of the helical passageway. The scuppers are disposed in the catchment areas and are connected to and extend radially inward from the outer wall.

A water extractor includes a body, outer wall, inner wall, helical wall, plurality of catchment areas, scuppers, and a drain manifold. The body includes an inlet and an outlet. The inlet is fluidly connected to a tube with vanes along an internal surface of the tube. The inner wall is disposed radially inward from the outer wall and forms a main flow channel through a portion of the body. The helical wall extends between and is connected to the outer wall and the inner wall and forms a helical passageway fluidly connected to the inlet and the outlet. The helical passageway includes a plurality of turns along a bottom of the body. One of the plurality of catchment areas is disposed in a turn of the helical passageway. The scuppers are disposed in the catchment areas and are connected to and extend radially inward from the outer wall. The scuppers are configured to collect water from the helical passageway. The drain manifold is disposed along the body and between the inlet and the outlet and is fluidly connected to each of the plurality of catchment areas.

DETAILED DESCRIPTION

The proposed water extractor is created by additive manufacturing to enable a single component build and allow for weight reduction. The water extractor includes a helix to drive water particles to the outer wall of the helix where the water can be captured by scuppers which are included in every turn of the helix. The scuppers enable successive extraction of water along the helix. Benefits of the proposed water extractor include reduced size and weight, optimization of helix configuration to promote optimal behavior of water, and a single piece construction, thereby reducing costs.

Figure 1:
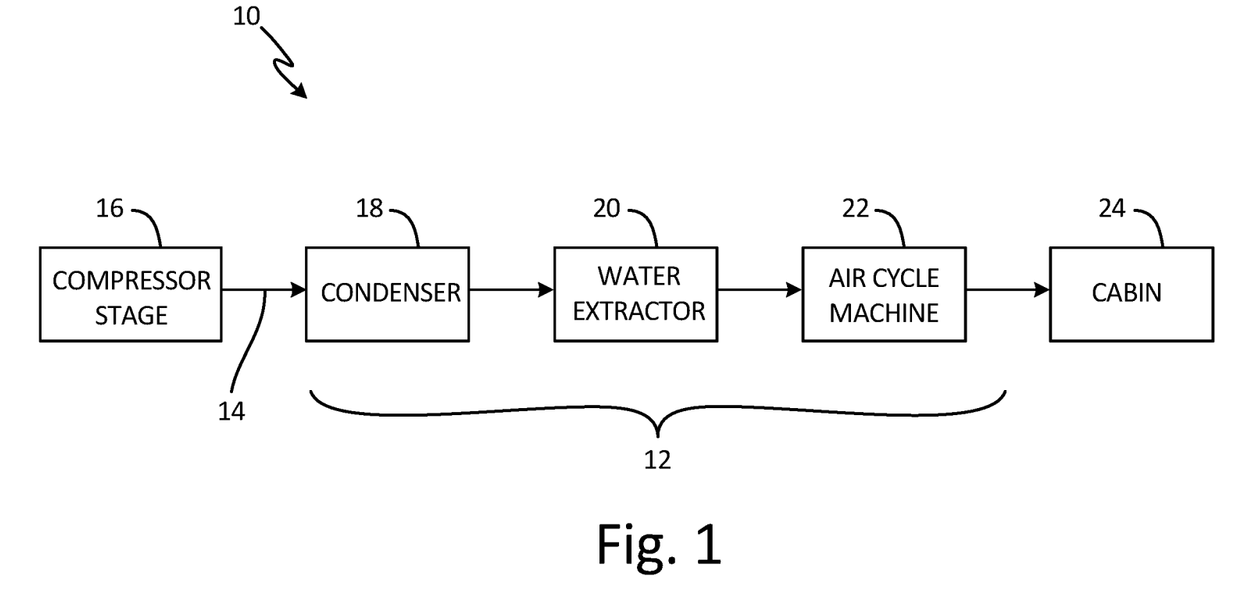
FIG. 1 is a schematic representation of an airflow progression through an aircraft air conditioning system.

FIG. 1 is a schematic representation of airflow progression 10 through air conditioning system 12. Airflow progression 10 is a representation of bleed air 14 as it passes from compressor stage 16, to air conditioning system 12 (which includes condenser 18, water extractor 20, and air cycle machine 22), and on to cabin 24. FIG. 1 is a simplified schematic representation of the system, highlighting the water extraction portion. All elements upstream of the condenser and downstream of the water extractor are not depicted.

Air conditioning system 12 is a sub-system of an aircraft engine that conditions bleed air 14 so that bleed air 14 can be re-used to perform an additional function within the aircraft. Bleed air 14 is air taken from compressor stage 16 of the aircraft engine. In other non-limiting embodiments, bleed air 14 can be compressed air taken from an ambient environment. Compressor stage 16 is an intermediate or high pressure stage within the aircraft engine. Condenser 18 is a heat exchanger for condensing moisture into droplets. Water extractor 20 is an elongated tube of solid material with channels for extracting moisture from bleed air 14. Air cycle machine 22 is a component of air condition system 14 for controlling the temperature and pressure of bleed air 14 exiting from air cycle machine 22 and into cabin 24. Cabin 24 is a compartment of the aircraft for housing passengers and equipment.

Via fluid lines or conduits in the aircraft, compressor stage 16 is fluidly connected to condenser 18, which is fluidly connected to water extractor 20. Water extractor 20 is fluidly connected to air cycle machine 22, and air cycle machine 22 is fluidly connected to cabin 24.

During operation of the aircraft engine, bleed air 12 is drawn from compressor stage 16 and fed into condenser 18 of air condition system 12. Condenser 18 condenses moisture in bleed air 14 from vapor into moisture droplets. In some non-limiting embodiments, bleed air 14 can be conditioned by a heat exchanger in to order to increase or decrease the temperature of bleed air 14 exiting from condenser 18. Bleed air 14, with the condensed moisture droplets, is then transported to air cycle machine 22. Air cycle machine 22 further conditions bleed air 14 by altering the temperature and pressure of bleed air 14 to a level appropriate for the passengers in cabin 24. A more detailed example of an aircraft air conditioning system and/or an environmental control system can be found in U.S. Pat. No. 8,347,647B2.

As will be discussed with respect to FIG. 2, the configuration of water extractor 20 allows a smaller, lighter, and easier to assemble water extractor than prior art examples of water extractors.

Figure 2:
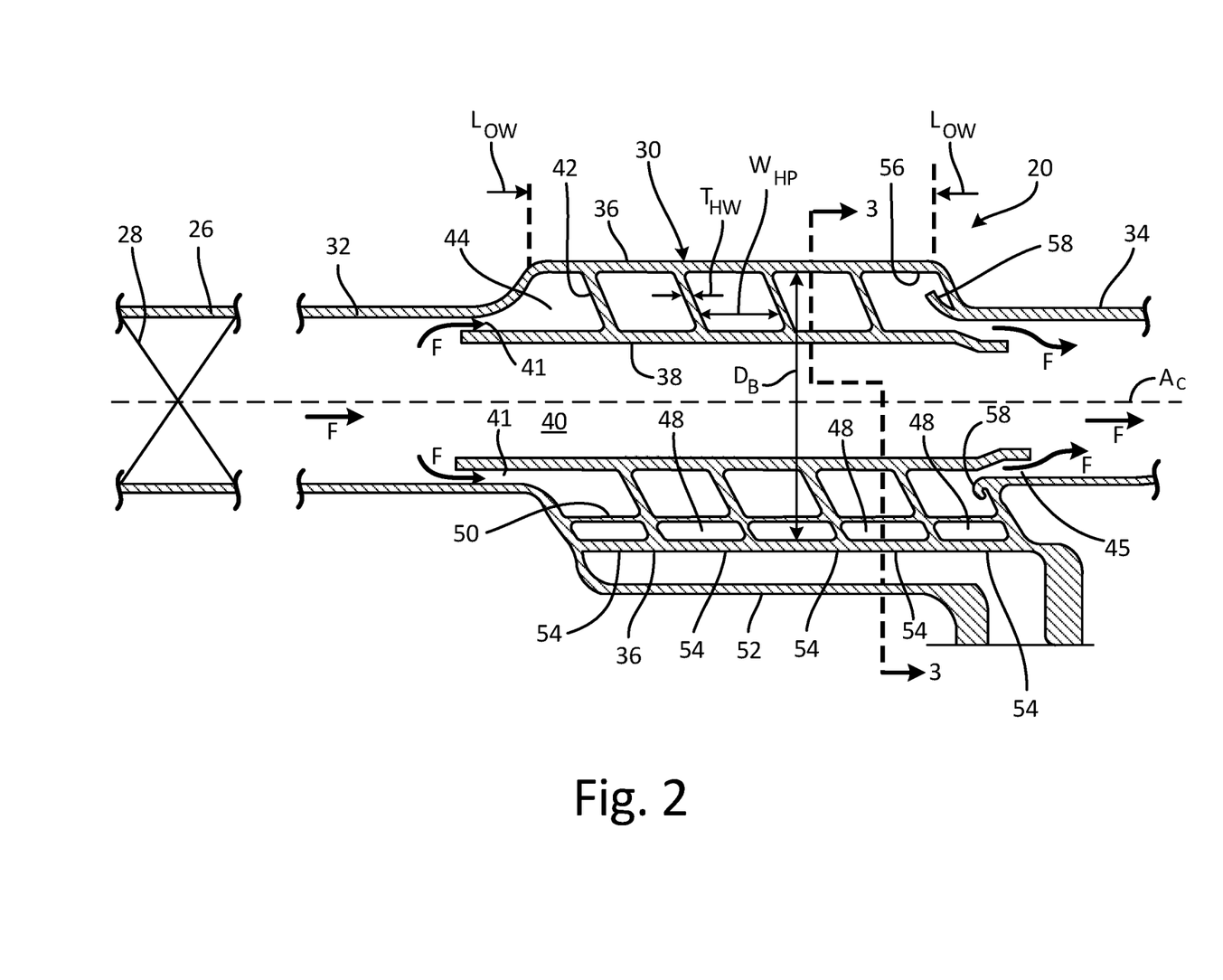
FIG. 2 is a cross-section view of a water extractor.
Figure 3:
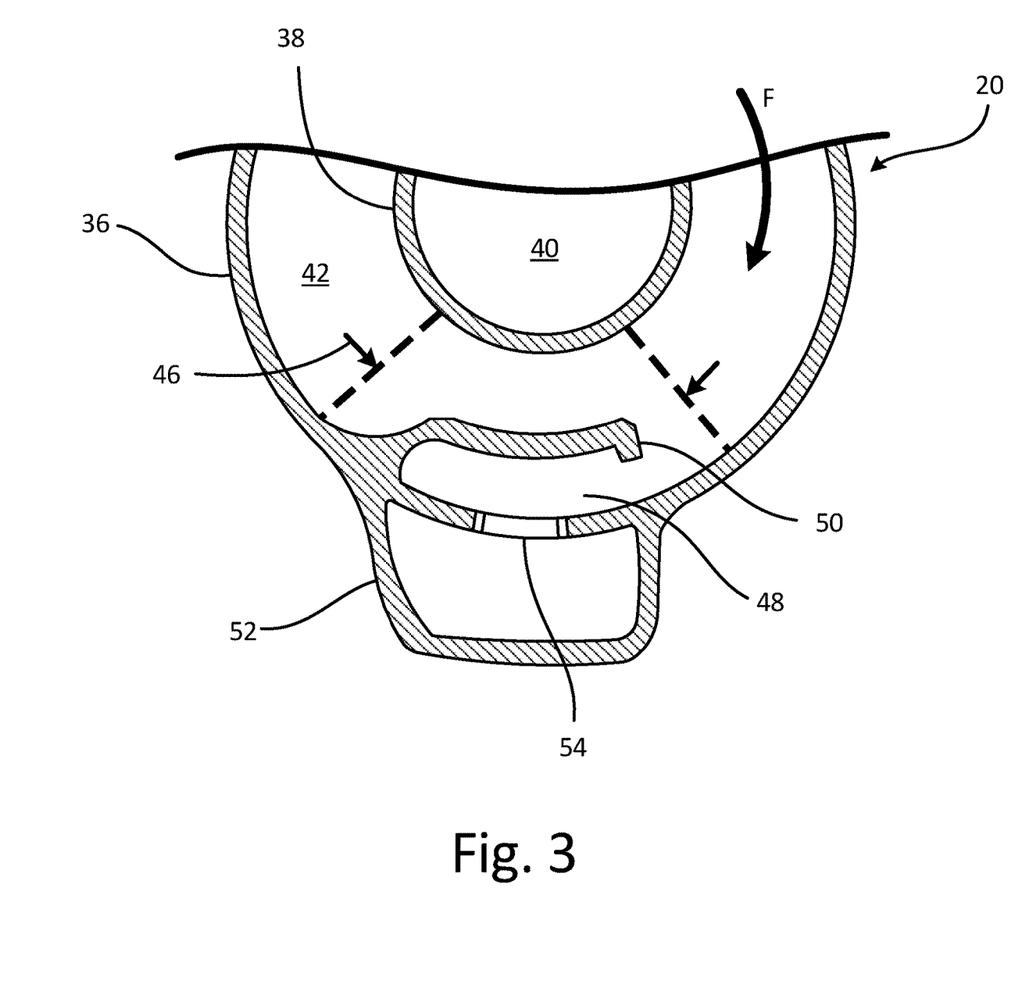
FIG. 3 is a cross-section view of the water extractor taken along 3-3 in FIG. 2.

FIG. 2 is a cross-section view of water extractor 20 and tube 26 with vanes 28. FIG. 3 is a cross-section view of water extractor 20 taken along 3-3 in FIG. 2. FIGS. 2 and 3 will be discussed together. Water extractor 20 includes body 30, inlet 32, outlet 34, outer wall 36, inner wall 38, main flow channel 40, entrance 41, helical wall 42, helical passageway 44, ejector 45, turns 46, catchment areas 48, scuppers 50, drain manifold 52, and ports 54. Outer wall 36 includes radially inner surface 56. Body 30 includes lip 58.

Water extractor 20 is a single piece of solid material such as aluminum, steel, titanium, polymer, or reinforced composite. Tube 26 is a pipe, tube, or conduit for the transmission of a fluid. Vanes 28 are fins or blades for imparting swirl or spin on a fluid which passes vanes 28. Body 30 is an elongated piece of solid material with a generally tubular shape. Body 30 includes length diameter $D_B$. In one non-limiting embodiment, diameter $D_B$ is uniform along an entire length $L_{OW}$ of outer wall 36. Put another way, outer wall 36 of body 30 is parallel to centerline axis $A_C$ of water extractor 20. Inlet 32 is an opening of body 30 disposed on an upstream (to the left in FIG. 2) end of body 30. Outlet 34 is an opening of body 30 disposed on a downstream (to the right in FIG. 2) end of body 30. Outer wall 36 is an outer surface of body 30 which extends circumferentially around body 30. Outer wall 36 includes length $L_{OW}$. Inner wall 38 is an inner surface of body 30 which includes a tubular shape. Main flow channel 40 is a flow channel or passageway. Entrance 41 is a gap between outer wall 36 and inner wall 38 and is located at an upstream end of inner wall 38. Helical wall 42 is a helical shaped wall, or a wall in the shape of a helix, with thickness $T_{HW}$. Helical passageway 44 is a helical shaped passageway, or a passageway in the shape of a helix, with width $W_{HP}$. Thickness $T_{HW}$ of helical wall 42 and width $W_{HP}$ of helical passageway 44, as well as a cross-sectional shape of helical passageway 44, may vary along any given point to create desired flow characteristics of the air through helical passageway 44. Ejector 45 is a gap or nozzle for fluid transfer. Ejector 45 is formed between the downstream ends of outer wall 36 and inner wall 38. Turns 46 (shown in FIG. 3) are turns or corners in helical passageway 44 positioned along a bottom of body 30 (the bottom of body 30 along a downward side of body 30 in FIGS. 2 and 3). In one non-limiting embodiment, a number of turns 46 can include five, or alternatively more or less than five. Catchment areas 48 are areas or portions of helical passageway 44 positioned along the bottom of body 30. Scuppers 50 are protrusions, arms, or projections of solid material. Drain manifold 52 is a collection basin or receptacle for the transmission of a fluid. Ports 54 are openings or orifices. Radially inner surface 56 of outer wall 36 is a surface of outer wall 36 that faces radially inwards. Lip 58 is an extension of solid material extending circumferentially within body 30.

Extractor 20 is physically and fluidly connected to tube 26 via inlet 32. Tube 26 is fluidly connected to condenser 18 or to another component of air conditioning system 12. Vanes 28 are connected to or formed together with tube 26. Vanes 28 extend radially inward from an internal surface of tube 26. Vanes 28 also extend inwards from tube 26 in a direction that is off-axis from a main flow direction of tube 26 and are configured to impart swirl upon a fluid, such as airflow F, that passes across vanes 28. Body 30 is fluidly connected to tube 26 via inlet 32 and to air cycle machine 22 via outlet 34. Inlet 32 and outlet 34 are also fluidly connected to main flow channel 40 and helical passageway 44. Outer wall 36 extends around a circumferentially outer edge of body 30. Inner wall 38 is disposed radially within outer wall 36 and is physically connected to outer wall 36 via helical wall 42. Main flow channel 40 is formed through a portion of body 30 by an interior of inner wall 38. Entrance 41 forms an entrance to helical passageway 44.

Helical wall 42 is connected to and extends between outer wall 36 and inner wall 38. Helical passageway 44 is formed by the space created by helical wall 42. Turns 46 are disposed along the bottom of body 30 and are formed by helical passageway 44. Catchment areas 48 are disposed in each of turns 46 of helical passageway 44 and are formed between outer wall 36 and scuppers 50. Scuppers 50 are disposed in catchment areas 48. Scuppers 50 are connected to and extend radially inward from outer wall 36. Scuppers 50 are configured to collect water from helical passageway 44. Scuppers 50 extend in a direction (left to right in FIG. 3) that is into airflow F (which is shown as clockwise in FIG. 3). Drain manifold 52 is disposed along and on a bottom of body 30 between inlet 32 and outlet 34. Drain manifold 52 is fluidly connected to each of catchment areas 48. Ports 54 extend through outer wall 36 and fluidly connect helical passageway 44 to drain manifold 52. Lip 58 extends upstream and radially outwards from an end of body 30. Lip 58 also extends into a portion of helical passageway 44 forming a toroidal cavity with its concavity facing in radially outward direction.

During operation of air conditioning system 12, airflow F is transported from condenser 18 to water extractor 20 via tube 26. Before airflow F enters water extractor 20, tube 26 with vanes 28 swirls airflow F in order to cause moisture in airflow F in a radially outwards direction. Moisture laden airflow F flows into water extractor 20 via inlet 32 of body 30. As airflow F enters into body 30 through inlet 32, a portion of airflow F is drawn into and through helical passageway 44 and another portion is drawn into and through main flow channel 40. Since airflow F is swirling as airflow F enters body 30, the moisture in airflow F is forced centrifugally in a radially outwards direction. Due to the swirling of airflow F, the portion of airflow F that enters helical passageway 44 contains a high amount of the moisture due to helical passageway 44 being positioned radially outwards of inner wall 38 and main flow channel 40.

Airflow F enters into helical passageway 44 through entrance 41. As airflow F travels through and around helical passageway 44, moisture from airflow F is deposited in the form of moisture droplets onto radially inner surface 56 of outer wall 36. The moisture droplets deposited onto radially inner surface 56 of outer wall 36 are drawn in a downwards direction due to gravity and airflow F and enter catchment areas 48 along helical passageway 44. The moisture deposited onto radially inner surface 56 of outer wall 36 is collected in catchment areas 48. In addition to the deposited water droplets, moisture droplets still entrained in airflow F are caught by scuppers 50 and collected into catchment areas 48. By extending in a direction that is into airflow F, scuppers 50 create a lip that juts into and scoops airflow F to collect moisture from helical passageway 44. The collected moisture is then drained from catchment areas 48 and into drain manifold 52 through ports 54. The moisture pours through ports 54 due to gravity and the positioning of drain manifold 52 and ports 54 being positioned along the bottom of body 30 (towards a downward direction in FIGS. 2 and 3). After the moisture is drained into drain manifold 52, the moisture can be fed into a component or element that is fluidly attached to drain manifold 52 such as a water recirculation, filtration, or cooling device.

After moisture is removed form airflow F, airflow F continues through helical passageway 44, to the end of helical passageway 44 (to the right side of helical passageway 44 in FIG. 2), and is combined with airflow F flowing through main channel 40. As airflow F exits helical passageway 44, lip 58 catches moisture from airflow F that was not collected by scuppers 50. Airflow F that flows through main channel 40 contains a higher velocity than airflow F coming out of helical passageway 44 through ejector 45 which creates a pressure differential to draw or pull airflow F through and out of helical passageway 44 via ejector 45.

The uniform size of diameter $D_B$ of body 30 along length $L_B$ of body 30 provides the benefit of water extractor 20 having a smaller size than previous water extractors which rely on an increasing flow area to cause the moisture to drop to a bottom of the water extractor. Without the need for the body of the water extractor to increase in diameter along the length of the body, water extractor 20 takes up less physical space in air conditioning system 12. This allows water extractor 20 to fit into smaller and tighter installation configurations. The decrease in size of water extractor 20 also translates into a smaller amount of material needed to produce water extractor 20 which provides cost, energy, and weight savings. The number of turns 46, shape of helical passageway 44, a pitch or angle of helical wall 42, and configuration of lip 58 can be varied and altered to allow for desired operational characteristics for water extractor 20 and air conditioning system 12.

In water extractor 20, extraction of moisture relies entirely on the centrifugal force of the moisture within helical passageway 44 to drive moisture particles to outer wall 36 where the moisture can be captured by scuppers 50.

In one non-limiting embodiment, the spacing and size of helical passageway 44 can be optimized based on results of a computational flow dynamics analysis, such as for example identifying an optimal pitch or angle, as well as a number of turns 46, of helical wall 42 which is preferable for maximum efficiency of water extractor 20.

Figure 4:
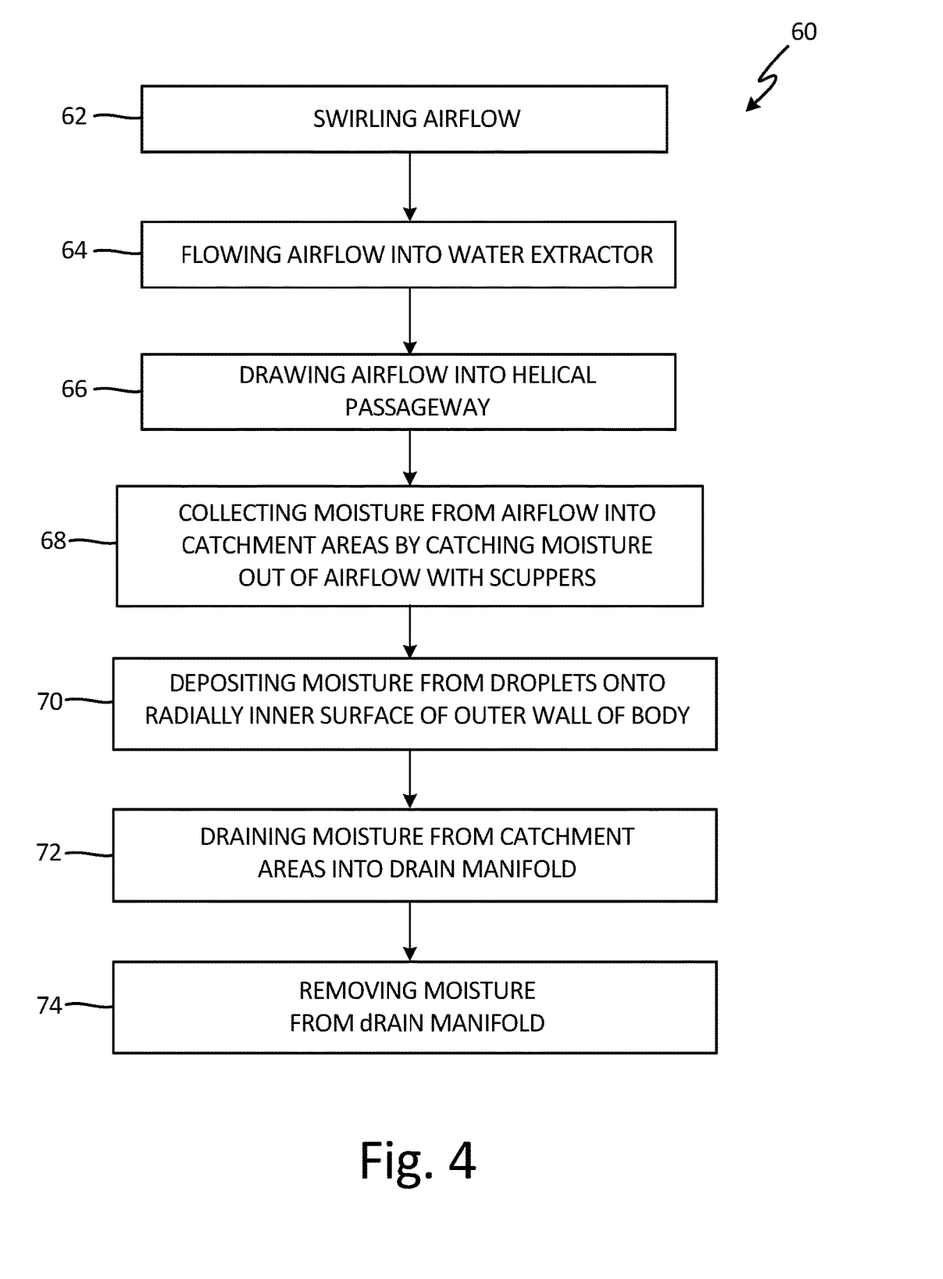
FIG. 4 is a flowchart of a method of extracting water from the air conditioning system of the aircraft.

FIG. 4 shows a flowchart of method 60 of extracting water from air conditioning system 12 of an aircraft. Method 60 includes steps 62-74. Step 62 includes swirling airflow F with vanes 28 to force moisture in airflow F in a radially outwards direction. Step 64 includes flowing airflow F into water extractor 20. Step 66 includes drawing airflow F into helical passageway 44. Step 68 includes collecting moisture from airflow F into catchment areas 48 by catching the moisture out of airflow F with scuppers 50. Step 70 includes depositing moisture droplets onto radially inner surface 56 of outer wall 36. Step 72 includes draining the moisture from each of catchment areas 48 and into drain manifold 52. Step 74 includes removing the moisture from drain manifold 52.

Figure 5:
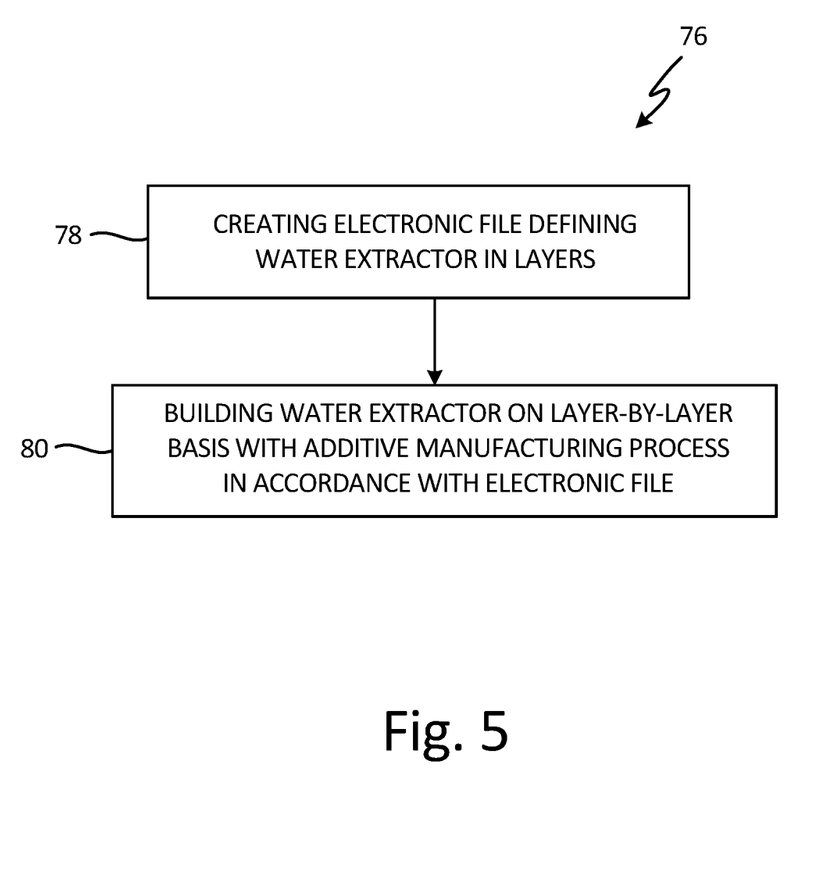
FIG. 5 is a flowchart of a method of additively manufacturing the water extractor.

FIG. 5 shows a flowchart of method 76 of making water extractor 20 with an additive manufacturing process. Method 76 includes steps 78 and 80. Step 78 includes creating an electronic file defining water extractor 20 in layers. Step 80 includes building water extractor 20 on a layer-by-layer basis with an additive manufacturing process in accordance with the electronic file. The additive manufacturing process used to make 20 water extractor can include direct metal laser sintering, selective metal laser sintering, injection molding, or stereolithography. A material used to make the water extractor comprises aluminum, steel, or polymer, as well as other metallic and non-metallic materials.

Using an additive manufacturing process to build water extractor 20 allows for the creation of all of the elements of water extractor 20 to be formed out a single piece of material which eliminates lengthy and costly assembly processes. Additively manufacturing water extractor 20 allows for the creation of helical wall 42 which cannot be manufactured out of a single piece of material using standard subtractive manufacturing techniques. Helical wall 42 allows for airflow F to travel in a swirl or spiral flowpath allowing for the functionality of water extractor 20 as described above. With scupper 50 collecting moisture from airflow F, a constantly increasing flow area of body 30 is no longer needed in order to collect water along the bottom of body 30 as was the case with prior art water extractors. This allows for body 30 to maintain a constant diameter along an entirety of length $L_B$ of body 30. The smaller diameter of body 30 allows for water extractor 20 to take up less volume and therefore less physical space within air conditioning system 12 in the aircraft.

Forming water extractor 20 out of a single piece of continuous material reduces manufacturing and assembly steps and costs. Additionally, in addition to a linear configuration of water extractor 20 as shown in FIGS. 2 and 3, water extractor 20 can be curved, arced, or bent, as well as include a serpentine configuration.

Discussion of Possible Embodiments

The following are non-exclusive descriptions of possible embodiments of the present invention.

A water extractor includes an inlet, an outlet, a body, outer wall, inner wall, helical wall, plurality of catchment areas, and/or scuppers. The body extends between the inlet and the outlet. The inner wall is disposed radially inward from the outer wall and forms a main flow channel through a portion of the body. The helical wall extends between and is connected to the outer wall and the inner wall and forms a helical passageway fluidly connected to the inlet and the outlet. The helical passageway includes a plurality of turns along a bottom of the body. One of the plurality of catchment areas is disposed in each turn of the helical passageway. The scuppers are disposed in each catchment area and are connected to and extend radially inward from the outer wall.

The water extractor of the preceding paragraph can optionally include, additionally and/or alternatively, any one or more of the following features, configurations and/or additional components.

A drain manifold can be disposed along the body and between the inlet and the outlet, wherein the drain manifold can be fluidly connected to each of the plurality of catchment areas.

Each of the plurality of catchment areas can comprise a port extending through the outer wall and/or fluidly connecting the helical passageway to the drain manifold.

The inlet can be fluidly connected to a tube with vanes along an internal surface of the tube, wherein the vanes can be configured to impart swirl upon a fluid that passes across the vanes.

The scupper can be configured to collect moisture from the helical passageway.

The water extractor can be a component of an air conditioning system of an aircraft.

The water extractor can be formed with an additive manufacturing process comprising direct metal laser sintering, selective metal laser sintering, injection molding, and/or stereolithography.

The outer wall can be parallel to a centerline axis of the water extractor.

A method of extracting water from an air conditioning system of an aircraft, the method can comprise: flowing airflow into the water extractor; drawing the airflow into the helical passageway; collecting moisture from the airflow into the catchment areas by catching the moisture with the scupper; and/or draining the moisture from each of the plurality of catchment areas and into the drain manifold.

The airflow can be swirled to force moisture in the airflow in a radially outwards direction.

Moisture droplets can be deposited onto a radially inner surface of the outer wall.

A method of making a water extractor includes creating an electronic file defining the water extractor in layers. The water extractor is built on a layer-by-layer basis with an additive manufacturing process in accordance with the electronic file. The water extractor includes a body, outer wall, inner wall, helical wall, plurality of catchment areas, and/or scuppers. The body includes an inlet and an outlet. The inner wall is disposed radially inward from the outer wall and forms a main flow channel through a portion of the body. The helical wall extends between and is connected to the outer wall and the inner wall and forms a helical passageway fluidly connected to the inlet and the outlet. The helical passageway includes a plurality of turns along a bottom of the body. One of the plurality of catchment areas is disposed in each turn of the helical passageway. The scuppers are disposed in the catchment areas and/or are connected to and extend radially inward from the outer wall.

The method of the preceding paragraph can optionally include, additionally and/or alternatively, any one or more of the following features, configurations and/or additional components.

The additive manufacturing process used to make the water extractor can comprise direct metal laser sintering, selective metal laser sintering, injection molding, and/or stereolithography.

A material used to make the water extractor comprises aluminum, steel, titanium, or polymer.

A water extractor includes an inlet, an outlet, a body, outer wall, inner wall, helical wall, plurality of catchment areas, scuppers, and/or a drain manifold. The body extends between the inlet and the outlet. The inlet is fluidly connected to a tube with vanes along an internal surface of the tube. The inner wall is disposed radially inward from the outer wall and forms a main flow channel through a portion of the body. The helical wall extends between and/or is connected to the outer wall and the inner wall and forms a helical passageway fluidly connected to the inlet and the outlet. The helical passageway includes an entrance and an ejector. The entrance is disposed at an upstream end of the helical passageway. The ejector is disposed at a downstream end of the helical passageway. The helical passageway includes a plurality of turns along a bottom of the body. One of the catchment areas is disposed in each turn of the helical passageway. The scuppers are disposed in the catchment areas and are connected to and/or extend radially inward from the outer wall. The scuppers are configured to collect water from the helical passageway. The drain manifold is disposed along the body and between the inlet and the outlet and is fluidly connected to each of the plurality of catchment areas.

The water extractor of the preceding paragraph can optionally include, additionally and/or alternatively, any one or more of the following features, configurations and/or additional components.

Each of the plurality of catchment areas can comprise a port extending through the outer wall and fluidly connecting the helical passageway to the drain manifold.

The water extractor can be formed with an additive manufacturing process comprising direct metal laser sintering, selective metal laser sintering, injection molding, or stereolithography.

The outer wall can be parallel to a centerline axis of the water extractor.

A method of extracting water from an air conditioning system of an aircraft, the method can comprise: swirling the airflow to force moisture in the airflow in a radially outwards direction; flowing airflow into the water extractor; drawing the airflow into the helical passageway; collecting moisture in the catchment areas deposited onto a radially inner surface of the outer wall; collecting the moisture from the airflow into the catchment areas by catching the moisture with the scupper; and/or draining the moisture from each of the plurality of catchment areas through the ports and into the drain manifold.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A water extractor comprising:
   an inlet and an outlet;
   a body extending between the inlet and the outlet;
   an outer wall;
   an inner wall disposed radially inward from the outer wall, the inner wall forming a main flow channel through a portion of the body;
   a helical wall extending between and connected to the outer wall and the inner wall, the helical wall forming a helical passageway fluidly connected to the inlet and the outlet, wherein the helical passageway includes a plurality of turns along a bottom of the body;
   an ejector of the helical passageway, the ejector disposed at a downstream end of the helical passageway, wherein a gap between a downstream end of the inner wall and the outer wall creates the ejector, wherein the ejector comprises a nozzle for creating a pressure differential to draw airflow through and out of the helical passageway;

a plurality of catchment areas, wherein one of the catchment areas is disposed in each turn of the helical passageway; and a scupper disposed in each catchment area, wherein the scupper is connected to and extends radially inward from the outer wall.

2. The water extractor of claim 1 and further comprising a drain manifold disposed along the body and between the inlet and the outlet, wherein the drain manifold is fluidly connected to each of the plurality of catchment areas.

3. The water extractor of claim 2, wherein each of the plurality of catchment areas comprises a port extending through the outer wall and fluidly connecting the helical passageway to the drain manifold.

4. The water extractor of claim 1, wherein the inlet is fluidly connected to a tube with vanes along an internal surface of the tube, wherein the vanes extend radially inward from an internal surface of the tube, wherein the vanes comprise blades that are configured to impart swirl upon a fluid that passes across the vanes.

5. The water extractor of claim 1, wherein the scupper is configured to collect moisture from the helical passageway, wherein a shape of the scupper comprises a scoop with a lip.

6. The water extractor of claim 1, wherein the water extractor is a component of an air conditioning system of an aircraft.

7. The water extractor of claim 1, wherein the water extractor is formed with an additive manufacturing process comprising direct metal laser sintering, selective metal laser sintering, injection molding, or stereolithography.

8. The water extractor of claim 1, wherein the outer wall is parallel to a centerline axis of the water extractor.

9. A water extractor for an air conditioning system of an aircraft, the water extractor comprising:

an inlet and an outlet;
a body extending between the inlet and the outlet, wherein the inlet is fluidly connected to a tube with vanes along an internal surface of the tube;
an outer wall;
an inner wall disposed radially inward from the outer wall, the inner wall forming a main flow chamber through a portion of the body;
a helical wall extending between and connected to the outer wall and the inner wall, the helical wall forming a helical passageway fluidly connected to the inlet and the outlet, wherein the helical passageway includes a plurality of turns along a bottom of the body;
an entrance of the helical passageway, the entrance disposed at an upstream end of the helical passageway;
an ejector of the helical passageway, the ejector disposed at a downstream end of the helical passageway, wherein a gap between a downstream end of the inner wall and the outer wall creates the ejector, wherein the ejector comprises a nozzle for creating a pressure differential to draw airflow through and out of the helical passageway;
a plurality of catchment areas, wherein one of the catchment areas is positioned in each turn of the helical passageway;
a scupper disposed in each catchment area, wherein the scupper is connected to and extends radially inward from the outer wall, wherein a shape of the scupper comprises a scoop with a lip, and further wherein the scupper is configured to collect water from the helical passageway; and
a drain manifold disposed along the body and between the inlet and the outlet, wherein the drain manifold is fluidly connected to each of the plurality of catchment areas.

10. The water extractor of claim 9, wherein each of the plurality of catchment areas comprises a port extending through the outer wall and fluidly connecting the helical passageway to the drain manifold.

11. The water extractor of claim 9, wherein the water extractor is formed with an additive manufacturing process comprising direct metal laser sintering, selective metal laser sintering, injection molding, or stereolithography.

12. The water extractor of claim 9, wherein the outer wall is parallel to a centerline axis of the water extractor.

* * * * *